United States Patent [19]

Rafi-Zadeh

[11] Patent Number: 4,469,364

[45] Date of Patent: Sep. 4, 1984

[54] TOOL BOX FOR COVERED PICKUP TRUCKS

[76] Inventor: Hassan Rafi-Zadeh, 5301 E. Mockingbird La., Paradise Valley, Ariz. 85253

[21] Appl. No.: 424,009

[22] Filed: Sep. 27, 1982

[51] Int. Cl.³ .............................................. B60R 11/06
[52] U.S. Cl. ................................ 296/37.6; 296/24 R; 224/42.42
[58] Field of Search .................. 296/37.6, 37.1, 24 R; 224/42.42 R; 220/21; 206/45.18, 45.24, 45

[56] References Cited

U.S. PATENT DOCUMENTS

| | | | |
|---|---|---|---|
| 1,503,142 | 7/1924 | Susseles | 206/45.18 |
| 3,664,704 | 5/1972 | Ellis | 296/24 R |
| 3,675,885 | 7/1972 | Shute | 248/351 |
| 3,727,971 | 4/1973 | Sisler | 296/37.6 |
| 3,880,458 | 4/1975 | Jackson | 296/37.6 |
| 4,103,956 | 8/1978 | Faulstich | 296/24 R |

*Primary Examiner*—Robert R. Song
*Attorney, Agent, or Firm*—Herbert E. Haynes, Jr.

[57] ABSTRACT

Receptacle units (16, 18, 18′, 20, and 20′) for use independently or in any combination in conjunction with a pickup truck (10) having a bed (12) in which the units can be arranged, and a movable cover (14) arranged over the bed. Some of the receptacle units can be provided with drawers slidable rearwardly of the associated truck bed so as to permit easy access to articles stored in the receptacle units, while permitting the units to be secured by action of the associated cover and a cooperating tailgate of the associated truck.

13 Claims, 10 Drawing Figures

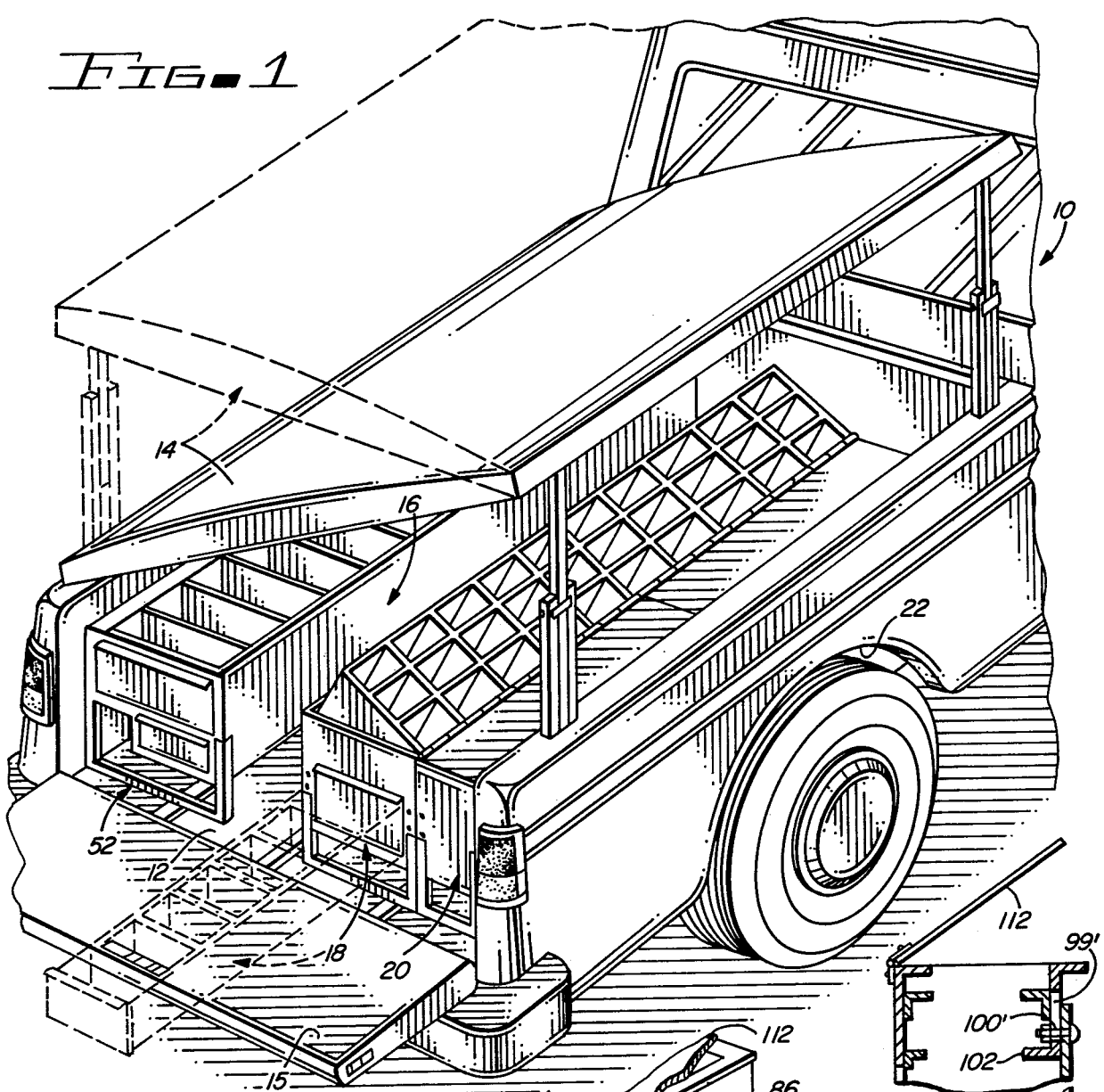
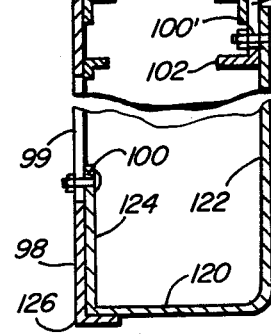
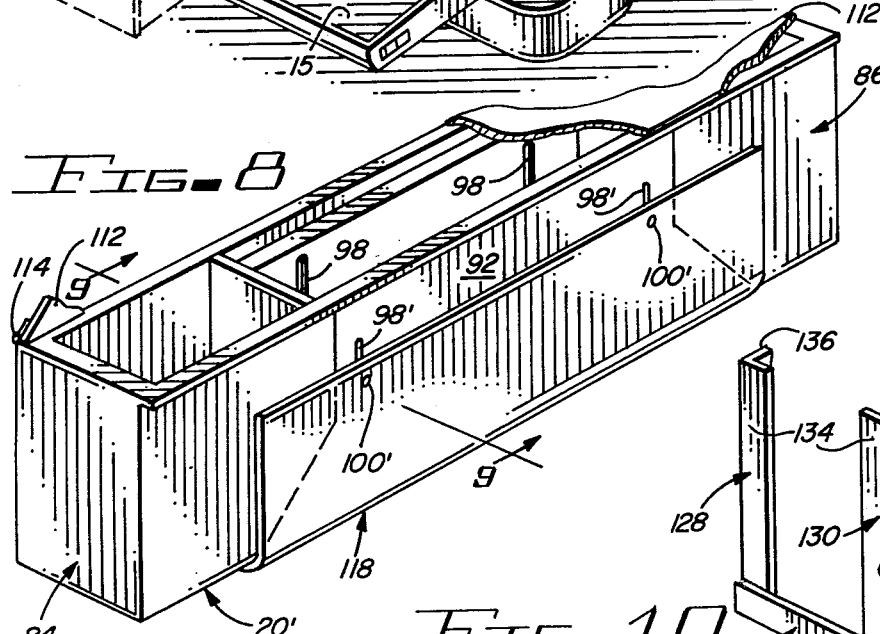
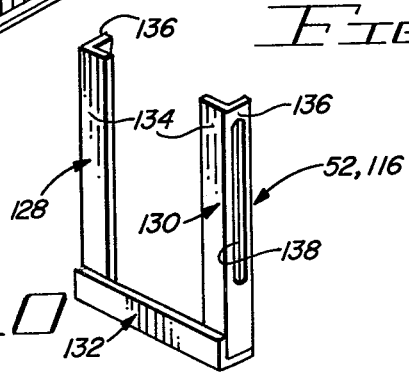

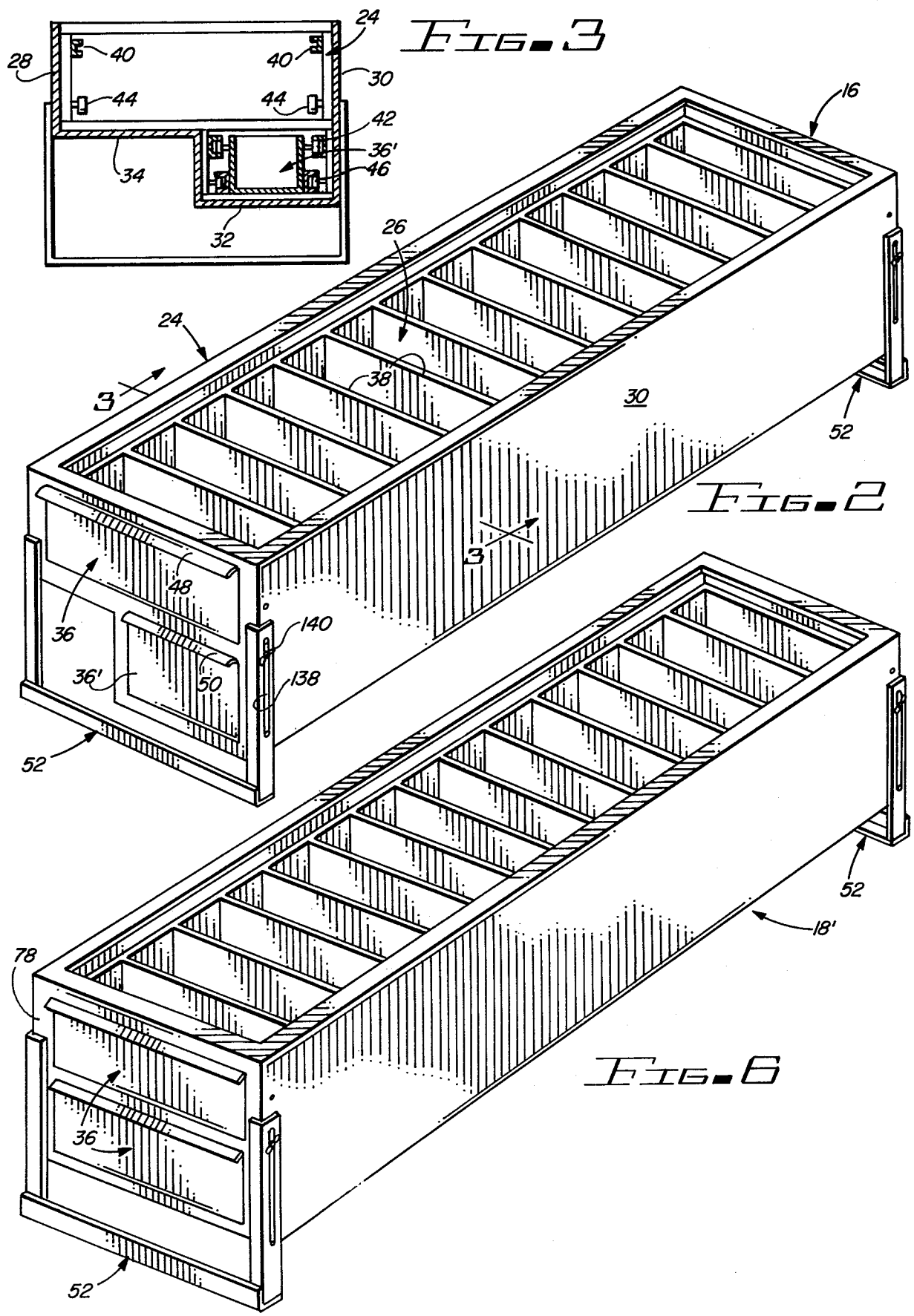

TOOL BOX FOR COVERED PICKUP TRUCKS

BACKGROUND OF THE INVENTION

1. Field of the Invention

This invention relates generally to receptacle units arrangeable in the bed of a conventional pickup truck, and the like, and more particularly to such receptacle units specially suited for use with truck beds provided with a suitable cover.

2. Description of the Prior Art

It generally is known to place various boxes, cabinets, and the like, either in the bed itself or on sidewalls partially defining a bed area of a pickup truck, utility trailer, or other suitable vehicle. Examples of boxes intended for such use can be found in U.S. Pat. Nos. 3,940,099, issued Feb. 24, 1976, to J. Celes; 4,215,896, issued Aug. 5, 1980, to M. J. Drouin; and 4,288,011, issued Sept. 8, 1981, to R. D. Grossman. The device disclosed in the latter mentioned patent is adjustable transversely of a truck bed so as to fittingly adjust to beds of various widths, while the container disclosed in U.S. Pat. No. 4,215,896, uses the tail gate of an associated truck for providing a closure to the container. This illustrates a basic problem with boxes as conventionally employed with pickup trucks, and the like, in that provision must be made for securely anchoring the box to the vehicle, and for providing a secure closure to the box or other suitable container itself.

U.S. Pat. Nos. 3,675,885, issued Jul. 11, 1972, and 3,810,273, issued May 14, 1974, both to A. L. Shute, disclose a cover arrangeable over the bed of a pickup truck, utility trailer, and the like, in such a manner so as to cooperate with the conventionally provided tail gate to secure the interior of the enclosure being covered. The use of such a cover is particularly advantageous, inasmuch as no special arrangements may be made for the security of various receptacles or other articles arranged within the enclosed area under the cover, while the cover itself may be raised in a convenient manner to provide access to the enclosed area as desired as well as to provide increased volume under cover for specific hauling situations. The conventional receptacle units provided for arrangements in a pickup truck bed, and the like, are not necessarily convenient to use in conjunction with such covers, however.

It is known to provide drawer units mountable on pickup trucks and similar vehicle bodies in which the unit slides rearwardly of the associated vehicle. Such devices, examples of which can be found in U.S. Pat. Nos. 2,784,027, issued Mar. 5, 1957, to C. R. Temp, and 3,826,529, issued Jul. 30, 1974, to R. J. Wood, generally slide as an integral unit, rather than individual drawers sliding relative to a fixed frame. The unit disclosed in U.S. Pat. No. 2,784,027, is arrangeable on the floor of a pickup bed so as to be covered by a false floor which provides a load receiving surface above the drawer unit. By this arrangement, the entire unit slides rearwardly of the bed of the pickup truck. The device disclosed in U.S. Pat. No. 3,826,529, on the other hand, discloses a rack slidably supported above a sideboard of an associated pickup truck bed for movement rearwardly of the bed as a unit. A basic disadvantage of such arrangements is that these container units, once loaded with tools, parts, and other articles, become very heavy, thus, creating problems in anchoring the units against undesired rearward movement. Further, or else properly balanced, the unit can be somewhat difficult to manipulate.

Many load-carrying vehicles are constructed with a wheel well extending into an associated load-receiving area of the vehicle. Accordingly, provision must be made to accomodate such a wheel well if a receptacle unit arrangeable in the load-receiving area of the vehicle is to be disposed immediately adjacent a sidewall partially defining a load-receiving area. Examples of receptacle units which accomodate such wheel wells can be found in U.S. Pat. Nos. 2,722,352, issued Nov. 1, 1955, to W. C. Dehnell; 3,245,713, issued Apr. 12, 1966, to D. A. Ogilvie; and 3,727,971, issued Apr. 17, 1973, to M. L. Sisler. The principle disadvantage with such known units is that they must be specifically constructed for use with load carrying vehicles having wheel wells protruding into the load-receiving area thereof, and results in much wasted space if used with vehicles of the kind not having such protruding wheel wells.

U.S. Pat. No. 2,978,153, issued Apr. 4, 1961, to T. H. Brindle, discloses a cabinet structure for automotive vehicles which is arrangeable on a sidewall of a pickup bed. Doors of the cabinet structure open laterally for access to the interior of the cabinet, while trays are disposed in offsets of the cabinets. Lugs are provided on the trays to prevent their shifting within the associated cabinet structure.

SUMMARY OF THE INVENTION

It is an object of the present invention to provide receptacle units which are convenient to use in conjunction with pickup truck beds, and the like, provided with a conventional cover affording security to the receptacle units.

It is another object of the present invention to provide receptacle units for vehicles which permit individual drawers of such units to move rearwardly of the vehicle in a safe, convenient, and easily manipulatable manner.

Yet another object of the present invention is to provide receptacle units for vehicles which can be used individually or in various combinations as desired to best suit a specific purpose.

Still another object of the present invention is to provide receptacle units which can readily fit into various kinds and sizes of load carrying vehicles, and which can be readily secured to same in a simple and efficient manner not requiring any modification of the vehicle.

Yet another object of the present invention is to provide a wheel well receptacle unit for load carrying vehicles which can be adjusted to provide maximum container capacity in dependence on the amount of protrusion, if any, of a wheel well into the associated load-receiving area of a vehicle.

These and other objects are achieved according to the present invention by providing container apparatus comprising a frame arrangeable in an associated load-receiving area and provided with a receptacle arrangement which permits access from above. The latter may be either an upwardly directed bin or storage compartment, or a drawer slidable relative to the associated frame. In particular, the container apparatus can include at least one of a first unit arrangeable for storing articles and including a recess disposed for receiving a wheel well of an associated vehicle in which the unit is mounted, a second unit arrangeable for storing articles and including a substantially symmetrical frame arrangeable on a generally planar surface, and a wheel well unit arrangeable for storing articles and permitting the frame thereof to wrap around an associated wheel well projecting into a load-receiving area in which the unit is disposed. These units can be used independently or in combination to best serve a particular purpose. The wheel well unit can provide maximum storage capacity with a given vehicle by having a bottom wall adjustable to rest on top of wheel wells of varying heights, and can be modified to be used with a load-receiving area into which a wheel well does not protrude at all.

Suitable brackets are provided for supporting the various units above a bed or other floor of an associated load-receiving area in a simple manner if so desired. The second unit described above is constructed so as to be selectively used with either an upwardly opening bin or with an extra reciprocating drawer, as desired.

It is an advantage of the present invention that the various receptacle units can be advantageously used with a covered pickup truck bed, and the like, in a simple yet secure manner.

It is another advantage of the present invention that only three basic units are required to fit virtually all pickup trucks, utility trailers, and the like, currently on the market and being used, thus eliminating the need to stock a large number of various styles and sizes.

The foregoing and other objects of this invention, as well as the invention itself, may be more fully understood when read in conjunction with the accompanying drawings.

BRIEF DESCRIPTION OF THE DRAWINGS

FIG. 1 is a fragmentary, diagrammatic, perspective view showing arrangement of a receptacle units according to the present invention in the bed of a pickup truck provided with a cover.

FIG. 2 is a diagrammatic, perspective view showing a first of the units seen in FIG. 1.

FIG. 3 is a diagrammatic, sectional view taken generally along the line 3—3 of FIG. 2, but with the drawers removed for clarity.

FIG. 6 is a diagrammatic, perspective view similar to FIG. 2 but showing a modified embodiment of the receptacle unit illustrated in the left hand side of FIG. 4.

FIG. 8 is a fragmentary, diagrammatic, perspective view showing a modified embodiment of the receptacle unit seen in the right hand portion of FIG. 4.

FIG. 9 is a fragmentary, diagrammatic, enlarged sectional view taken generally along the line 9—9 of FIG. 8.

FIG. 10 is a diagrammatic, perspective view showing a mounting bracket for use with any of the receptacle units illustrated above.

DESCRIPTION OF THE PREFERRED EMBODIMENTS

Figure 4:
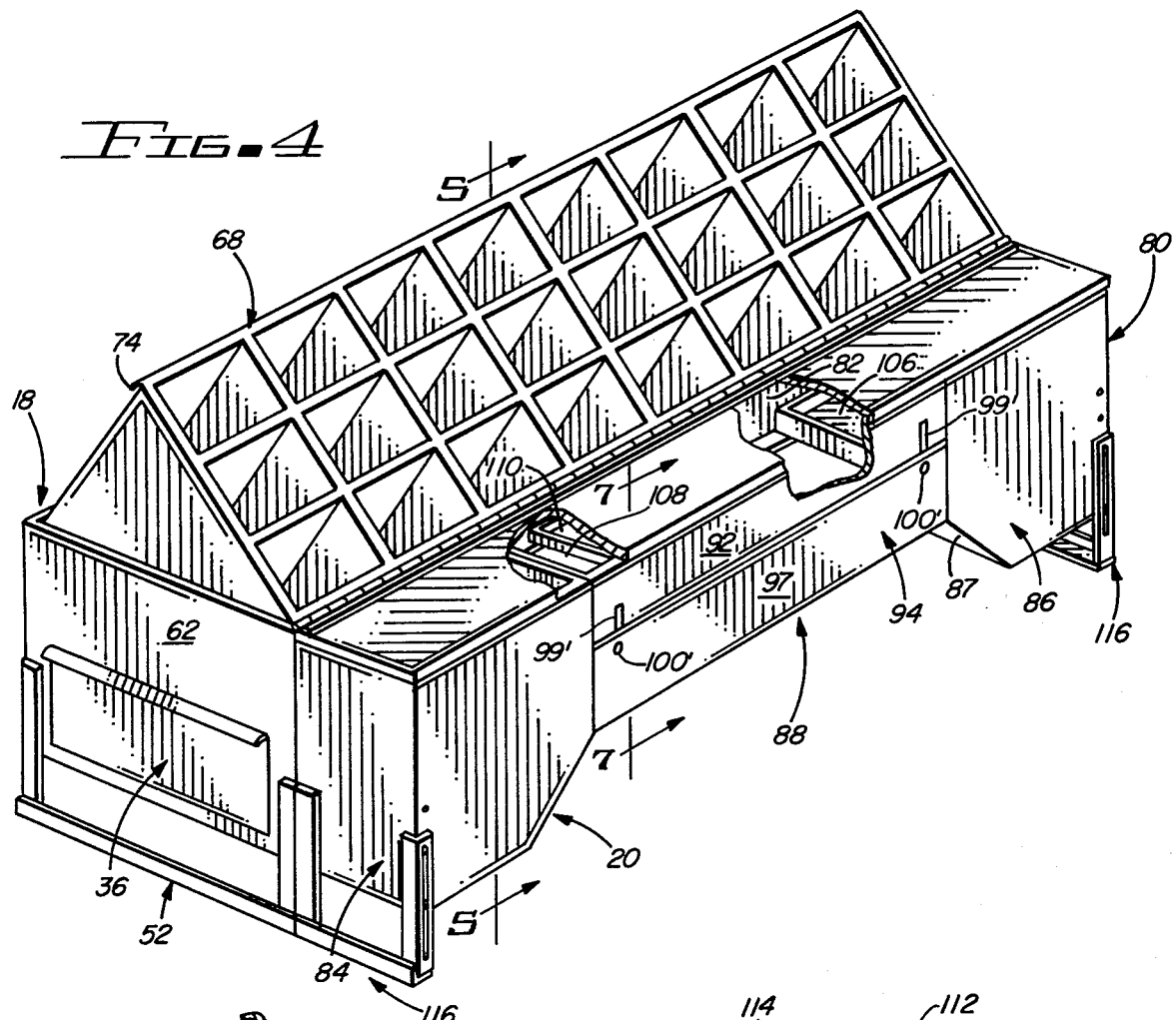
FIG. 4 is a diagrammatic, perspective view, partially broken away and in section, showing an additional pair of receptacle units as seen in FIG. 1.

Referring now more particularly to FIG. 1 of the drawings, there is illustrated a conventional pickup truck 10, and the like, having the usual bed 12 over which is arranged a movable cover 14. The latter is of conventional construction, such as disclosed in U.S. Pat. Nos. 3,675,885, issued Jul. 11, 1972, and 3,810,273, issued May 14, 1974, to A. L. Shute, the disclosures of which are incorporated herein. While receptacle units according to the present invention and to be described in detail below are primarily intended to be used with a cover assembly, such as cover 14, it is to be understood that the present invention can be used with any suitable covers such as conventionally employed to cover the beds of pickup trucks, utility and camping trailers, and the like. An important feature of cover 14 is that it will cooperate with the tailgate 15 of truck 10 to secure in a known manner the load-receiving area of truck 10.

Although all three receptacle units according to the present invention and to be now described are illustrated as arranged on bed 12 of truck 10, it is to be understood that these units can be used independently or in any combination, as desired.

Disposed on bed 12 is a first receptacle unit 16 arranged for storing articles (not shown) of various descriptions. This unit 16 includes a recess for receiving a wheel well (not shown) adjacent an associated side of bed 12. A second receptacle unit 18 is arranged for storing articles of various descriptions, and includes a substantially symmetrical frame arrangeable on a generally planar surface portion of bed 12, while the third unit is a wheel well unit 20 for storing articles as appropriate and permitting the frame thereof to wrap around an associated wheel well 22 projecting into the associated truck bed 12.

Referring now more particularly to FIGS. 2 and 3 of the drawings, unit 16 includes a frame 24 arrangeable in an associated truck bed, and the like, and provided with a receptacle arrangement 26 mounted thereon for providing access thereto from above. More specifically, frame 24 includes a pair of substantially parallel sidewalls 28 and 30, with the latter having a much greater vertical extent than the former. A lower surface 34 extends from sidewall 30 towards sidewall 28, but terminates in a stepped portion 34 joining a lower edge of sidewall 28 in order to form a recess arrangeable for receiving a wheel well (not shown) of an associated vehicle. As can be seen, a pair of drawers 36 and 36' are reciprocally mounted in frame 24 for sliding movement fore-and-aft of frame 24, and of truck bed 12 (FIG. 1) so as to permit drawers 36, 36' to slide rearwardly of the associated bed 12. Each of the drawers, 36, 36', is illustrated as provided with a plurality of dividers 38, although the internal configuration of the drawers may vary. The interior of drawer 36' has not been shown for clarity. Each of the drawers 36, 36' is slidably mounted in a conventional manner as by provision of C-shaped tracks 40 and 42 having associated therewith rollers 44 and 46 which can be engaged by cooperating rollers and tracks (not shown) provided on drawers 36, 36' in a conventional manner, similar to the mounting of file drawers, desk drawers, and the like.

Each of the drawers 36, 36' is provided with a lip forming a handle 48, 50, respectively, so as to facilitate manipulation of the associated drawer.

The frame 24 can be placed directly on a bed 12, and the like, or can be affixed thereto in a simple and convenient manner by use of generally U-shaped brackets 52 to be described in greater detail below.

Figure 5:
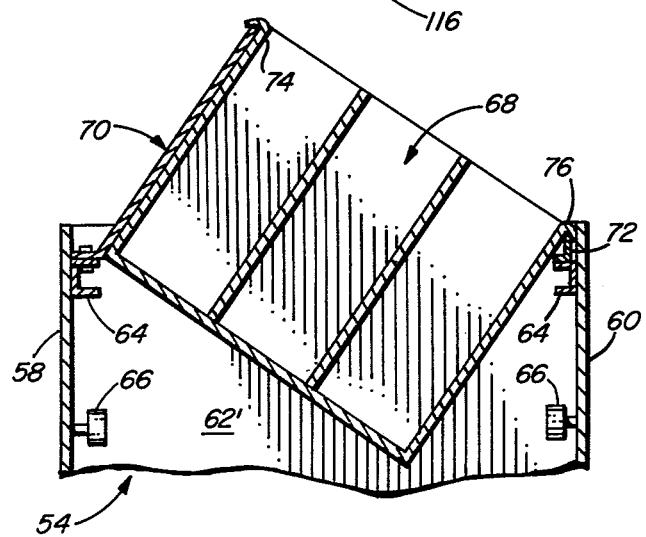
FIG. 5 is a fragmentary, diagrammatic, enlarged sectional view, taken generally along the line 5—5 of FIG. 4, but showing only the left hand of the pair of receptacle units seen in FIG. 4.

Referring now more particularly to FIGS. 4 and 5 of the drawings, unit 18 is illustrated as including a frame 54 in which is mounted a receptacle arrangement 56. Frame 54 in this instance can be formed from a pair of substantially parallel sidewalls 58 and 60 of generally similar dimensions, and tied together by suitable end walls 62 and 62'. Illustrated as being mounted on the sidewalls 58 and 60 are C-shaped tracks 64 and associated rollers 66 the purpose of which will become clear below and in order to exemplify a track and roller arrangement disposed in the lower portion of frame 54 in order to slidably mount a drawer 36 as described above. Mounted in the upper portion of frame 54 is a bin 68 comprising a plurality of compartments eggcrate fashion. Bin 68 is supported by a generally upwardly standing bracket 70 and an associated L-shaped bracket 72 which are engaged by longitudinally extending, substantially parallel rim portions 74 and 76 of bin 68. As can be seen, bracket 70 has a bent edge which is secured to one of the tracks 64 in a suitable manner, such as by the illustrated screw fasteners, while bracket 72 can be secured to the other track 64 also in a suitable manner, such as by welding. Once bracket 70 and 72 are in place, bin 68 can be positioned merely by dropping the rim portions 74 and 76 over the upstanding legs of brackets 70, 72. It also will be appreciated that the inclination of a bin 68 relative to the rectangular symmetry of the associated frame 54 can be varied by varying the length of the bracket 70.

Unit 18 can be changed to a unit 18' as shown in FIG. 6, in a simple manner by substituting an end wall 78 for end wall 62 so as to accomodate an additional drawer 36, and by removal of bracket 70 so as to permit a roller (not shown) associated with drawer 36 to move along the associated track 64. As can be seen, this arrangement permits unit 18, 18' to be modified as desired to suit a specific purpose.

Figure 7:
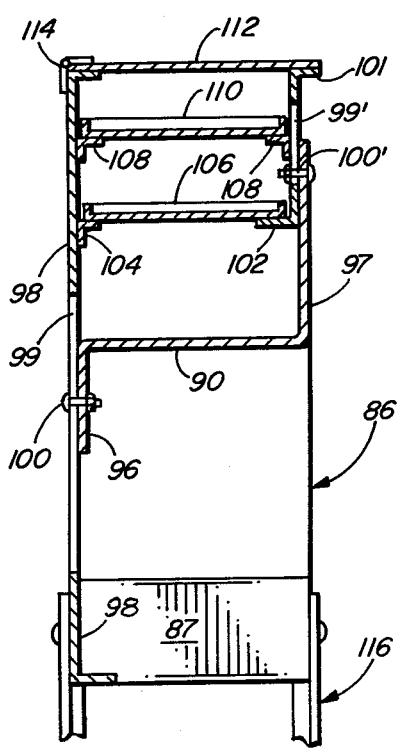
FIG. 7 is a fragmentary, diagrammatic, enlarged sectional view taken generally along the line 7—7 of FIG. 4, and showing the right hand receptacle unit seen in that figure.

Receptacle unit 20, the wheel well unit, will now be discussed in conjunction with FIGS. 4 and 7 of the drawings. This unit comprises a frame 80 which accomodates a receptacle arrangement 82 partially formed by a pair of mirror-image well portions 84 and 86. Each of the portions 84 and 86 is generally rectangular in configuration with an open top and an inclined surface 87 arranged for permitting frame 80 to wrap-around an associated wheel well (not shown). Disposed between portions 84 and 86, and connecting same together, is a storage portion 88 including a bottom wall 90 adjustable toward and away from an associated truck bed 12 (FIG. 1) in order to accomodate a specific, associated wheel well.

Storage portion 88 includes a brace member 92 arranged extended between and connected to the well portions 84 and 86. An enclosing part 94, partially formed by bottom wall 90, and a flange 96 and a planar part 97 each extending away from bottom wall 90 in substantially parallel planes but in opposite directions so as to form an S or Z shape. A back wall 98 of unit 20 is provided with a pair of elongated slots 99 extending substantially parallel to one another in spaced relation substantially from top to bottom of back wall 98. Provided on brace member 92 are a similar pair of elongated slots 99'. By suitable provision of apertures in flange 96 and planar part 97, enclosing part 94 can be attached to back wall 98 and brace member 92, respectively, by use of slots 99, 99' and conventional fasteners 100, 100', as illustrated. By this arrangement, bottom wall 90 can be adjusted relative to back wall 98 to accomodate a specific wheel well (not shown) being cleared by storage portion 88. Further, although not illustrated, an enclosing part 94 of different configuration, that is either flange 96 or part 97 or both, can be made longer, so as to permit bottom wall 90 to be lowered even further than possible in the illustrated embodiment.

Brace member 92 has in the upper portion thereof a lip 101, and terminates in the lower part thereof in an inwardly extending flange 102. This flange 102 cooperates with a coplanar leg of a rail 104, which may be a length of angle, as illustrated, and on which a tray 106 may rest. While flange 102 and cooperating rail 104 may extend entirely across the frontal extent of storage portion 88, a further pair of rails 108 supporting a tray 110, similar to tray 106, may be provided only on the left hand side of the extent of storage portion 88 as seen in FIG. 4. By this arrangement, both trays 106, 110 can be exposed to view simultaneously, or tray 106 may be placed beneath tray 110 to make additional storage space available in the right hand side of portion 88.

A pair of lids 112, each swingingly mounted on the upper inturned edge of back wall 98 as by conventional hinges 114 are selectively movable between a position covering the portions 84, 86, and 88, and a position permitting access into same. Although the manner of attaching together portions 84, 86, and brace member 92 may vary, spot welding, and the like, has been found satisfactory.

A generally U-shaped bracket 116, similar to bracket 52, but having a shorter back portion, can be used for securing unit 20 to a truck bed, and the like, or merely supporting the unit above a suitable surface, as desired.

FIGS. 8 and 9 illustrate a modified embodiment of unit 20, designated unit 20' wherein an enclosing part 118 can be provided for use when unit 20' is not associated with a wheel well. This enclosing part 118 has a generally planar bottom wall 120 upwardly from spaced peripheral portions of which extend a generally planar front wall 122 and a flange 124. By attachment of wall 122 and flange 124 to brace member 92 and back wall 98 by use of slots 99' and 99, respectively, storage portion 88 can extend downwardly to the bottom of well portions 84 and 86. A ledge 126 advantageously is provided at the lower edge of back wall 98 for further supporting bottom wall 120 of enclosing part 118.

A more detailed example of a bracket 52, 116 is illustrated in FIG. 10, wherein it can be seen that such a bracket includes a pair of generally parallel arms 128 and 130 each constructed from a length of angle and connected by a back element 132 which may also be of a similar material and attached to arms 128 and 130 in any suitable manner, such as by welding, to the coplanar arms 134 of legs 128, 130. The parallel, but not coplanar legs 136 of arms 128, 130, are provided with substantially coextensive, elongated slots 138 for adjustably receiving a suitable screw fastener 140, such as a wingnut (FIG. 2). A plurality of holes may be provided in the end portions of sidewalls of an associated unit frame for also receiving the fasteners 140.

As can be readily understood from the above description and from the drawings, receptacle units according to the present invention permit various items to be stored in a safe yet accessible manner. In particular, these receptacle units are advantageous when used in conjunction with a conventional pickup cover in order to convert any truck into a mobile workshop.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. In combination, a pickup truck having a bed which has a front and a rear and a fore-and-aft extent between the front and rear, a movable cover arranged over the bed, and a set of containers comprising:
   (a) first unit means for storing articles and including recess means for receiving a wheel well and having a drawer arranged for reciprocating along the fore-and-aft extent and rearwardly of the associated bed of the truck;
   (b) second unit means for storing articles and including a substantially symmetrical frame having a planar bottom and having a drawer arranged for reciprocating along the fore-and-aft extent and rearwardly of the associated bed of the truck; and
   (c) wheel well unit means for storing articles and including a frame arranged for wrapping around an associated wheel well projecting into the bed of the truck, said wheel well unit means comprising a pair of similar well portions separated from one another and connected together by a storage portion including a bottom wall adjustable toward and away from the associated bed of the truck in order to accomodate a specific wheel well while maximizing storage capacity within the storage portion; at least one of said first unit means, said second unit means, and said wheel well unit means being disposed in the bed.

2. An article containing apparatus for use in a load-receiving truck bed comprising in combination:
   (a) a truck bed having a planar floor with an opposed pair of elongated upstanding sidewalls which define an open top and a rearwardly open end;
   (b) a movable tailgate in the open end of said truck bed for selective opening and closing thereof;
   (c) a movable cover on the open top of said truck bed for selective opening and closing thereof;
   (d) an elongated frame means in said truck bed and coextensive with the sidewalls thereof, said frame means defining an open top and a rearwardly opening end;
   (e) receptacle means in said frame means adjacent the open upper end thereof, said receptacle means having a plurality of upwardly opening compartments formed therein for containing articles;
   (f) an elongated drawer in said frame below said receptacle means; and
   (g) means in said frame for allowing reciprocal movement of said drawer rearwardly of said frame means through the open end thereof when said tailgate is positioned so as to open the end of said truck bed.

3. An article containing apparatus as claimed in claim 2 and further comprising means on said frame means for supporting said receptacle means at an inclined attitude.

4. An article containing apparatus as claimed in claim 2 and further comprising:
   (a) said frame means further defining a rearwardly opening end;
   (b) said receptacle means being in the form of a drawer; and
   (c) means in said frame means for allowing reciprocal movement of said receptacle means rearwardly of said frame means through the open end thereof when said tailgate is positioned so as to open the end of said truck bed.

5. An article containing apparatus as claimed in claim 2 wherein said frame means is recessed for clearing a wheel well of said truck bed.

6. An article containing apparatus as claimed in claim 2 and further comprising bracket means for attaching said frame means to the planar floor of said truck bed.

7. An article containing apparatus as claimed in claim 6 wherein said bracket means is adjustable for vertically positioning said frame means substantially flush with respect to the open top of said truck bed.

8. An article containing apparatus as claimed in claim 2 and further comprising a wheel well receptacle unit interposed between said frame means and one of the sidewalls of said truck bed.

9. An article containing apparatus as claimed in claim 8 wherein said wheel well receptacle unit comprises:
   (a) a pair of article containing well portions positioned along the length of the one sidewall of said truck bed on opposite sides of a wheel well formed intermediate the opposite ends of the one sidewall of said truck bed; and
   (b) a storage portion interconnected between said pair of article containing well portions.

10. An article containing apparatus as claimed in claim 9 wherein said storage portion includes a bottom wall adjustably arranged to accomodate a specific wheel well.

11. An article containing apparatus for use in a load-receiving truck bed comprising in combination:
   (a) a truck bed having a planar floor with an opposed pair of elongated upstanding sidewalls which define an open top;
   (b) a movable cover on the open top of said truck bed for selective opening and closing thereof;
   (c) an elongated frame means in said truck bed and coextensive with the sidewalls thereof, said frame means defining an open top;
   (d) bracket means for attaching said frame means to the planar floor of said truck bed, said bracket means being adjustable for vertically positioning said frame means substantially flush with respect to the open top of said truck bed; and
   (e) receptacle means in said frame means, said receptacle means having a plurality of upwardly opening compartments therein for containing articles.

12. An article containing apparatus for use in a load-receiving truck bed comprising in combination:
   (a) a truck bed having a planar floor with an opposed pair of elongated upstanding sidewalls which define an open top;
   (b) a movable cover on the open top of said truck bed for selective opening and closing thereof;

(c) an elongated frame in said truck bed and coextensive with the sidewalls thereof, said frame means defining an open top;

(d) receptacle means in said frame means, said receptacle means having a plurality of upwardly opening compartments formed therein for containing articles; and (e) a wheel well receptacle unit interposed between said frame means and one of the sidewalls of said truck bed, said wheel well receptacle unit including, I. a pair of article containing well portions positioned along the length of the one sidewall of said truck bed on opposite sides of a wheel well formed intermediate the opposite ends of the one sidewall of said truck bed, II. a storage portion interconnecting said pair of article containing well portions.

13. An article containing apparatus as claimed in claim 12 wherein said storage portion includes a bottom wall adjustably arranged to accomodate a specific wheel well.

* * * * *